United States Patent [19]

Wilson et al.

[11] Patent Number: 4,843,994
[45] Date of Patent: Jul. 4, 1989

[54] BOAT FENDER COVER AND HANGER ASSEMBLY

[76] Inventors: Jeffery D. Wilson, 4960 Almaden Expressway, Suite 269, San Jose, Calif. 95118; Marianne L. Wilson, 15074 Herring Ave., San Jose, Calif. 95124

[21] Appl. No.: 254,310

[22] Filed: Oct. 6, 1988

Related U.S. Application Data

[63] Continuation-in-part of Ser. No. 85,080, Aug. 13, 1987, abandoned.

[51] Int. Cl.$^4$ .................................................. B63B 59/02
[52] U.S. Cl. ........................................ 114/219; 383/22; 383/79; 114/343
[58] Field of Search ............... 114/343, 219; 441/6, 441/13, 88; 383/6, 7, 22, 66, 67, 72, 79, 105, 123, 124, 127; 405/212

[56] References Cited

U.S. PATENT DOCUMENTS

| | | |
|---|---|---|
| D. 187,824 | 5/1960 | Bryan . |
| D. 217,645 | 5/1970 | Magi . |
| 2,753,829 | 7/1956 | Agra .................................. 114/219 |
| 2,885,989 | 5/1989 | Williamson ...................... 114/219 |
| 2,956,530 | 10/1960 | Hobbs ............................. 114/219 |
| 3,173,464 | 3/1965 | Curtis ................................ 383/22 |
| 3,475,914 | 11/1969 | Porter ............................. 114/219 |
| 3,737,329 | 6/1973 | Strelchuk ........................ 383/22 |
| 4,143,796 | 3/1979 | Williamson et al. ............ 383/67 |
| 4,157,134 | 6/1979 | Stoll ................................... 441/88 |
| 4,628,850 | 12/1986 | Day et al. ...................... 114/219 |

FOREIGN PATENT DOCUMENTS 2128076 4/1984 United Kingdom ................ 383/72

Primary Examiner—Sherman D. Basinger
Assistant Examiner—Stephen P. Avila
Attorney, Agent, or Firm—The Dulin Law Firm

[57] ABSTRACT

A combined protective and suspending assembly for fenders, more particularly to an abrasion and weather resistant cover for pneumatic or foam boat fenders of the cylindrical double-ended-eye type. The cover is a generally rectangular sheet of material preferably rip stop nylon, having a drawstring pocket at the bottom, and a heavy webbing along the side margins. In use, the cover wraps around the fender with one eye projecting below the drawstring. The drawstring passes through the eye and then extends to be used as the lacing to lace the cover to the fender. Extensions of the webbing form a hanger strap having grommets therein for being secured to turnbuckles fastened to the boat. The fabric cover may have a reflective exterior surface for night safety, and the strap may be used as a sling for carrying or for throwing the fender when used as an auxiliary float in man-overboard situations. The cover overlies the webbing to provide a flap to protect and hide the lacing. The preferred web material is a stitched or glued laminate of heavy canvas to heavy duty reinforced vinyl.

20 Claims, 1 Drawing Sheet

BOAT FENDER COVER AND HANGER ASSEMBLY

RELATED APPLICATION

This is a continuation-in-part of our application Ser. No. 07/085,080 filed Aug. 13, 1987 for Boat Fender Cover and Hanger Assembly, now abandoned.

FIELD

This invention relates to a combined protective and suspending assembly for fenders or bumper units, and more particularly to an abrasion and weather-resistant cover for pneumatic or foam boat fenders of the cylindrical double-ended-eye type, which cover has a special strap for securing to the boat.

BACKGROUND

Boat fenders are in common use to prevent damage to the boat upon docking. The most popular are cylindrical in shape and are pneumatic or foam-filled with a vinyl or elastomeric outer shell. Typically they have flanges projecting from each end with holes therein for a rope to secure them to the boat. U.S. Pat. Ser. No. et al., 4,628,850 shows a foam-filled type, while Magi D-217,645 illustrates a design configuration in which the end eye-flanges are integral with the shell.

Other types of fenders employ rope loops at each end instead of eyes, which ropes double as hand holders, e.g., Williamson U.S. Pat. Ser. No. 2,885,989 and Bryan D-187,824. The typical rope-type securing arrangement is shown in Hobbs U.S. Pat. Ser. NO. 2,956,530. Securing with ropes has the disadvantage of permitting the fender to roll easily out of position when trapped between the dock and boat. The rotation causes excess rope twisting which results in early rope fatigue, breakage and lost fenders. In addition, the ropes are easily fouled around deck and dock gear, brackets, and stays.

Other patents of interest are: Agra U.S. Pat. Ser. No. 2,753,829; Williamson et al., U.S. Pat. Ser. No. 4,143,796; Strelchuck U.S. Pat. Ser. No. 3,737,329; Stoll U.S. Pat. Ser. No. 4,157,134; Curtis U.S. Pat. Ser. No. 3,173,464; and Moodie U.K. 2,128,076.

Agra U.S. Pat. Ser. No. 2,753,829 shows a boat fender made of a roll of adhesive-faced sheet sponge material inserted in a canvas bag with drawstring top and bottom through grommet holes in the exposed folded hems. A rope bight is trapped in the layers of sponge, and the fender may be hung from one end of the rope.

Williamson et al., U.S. Pat. Ser. No. 4,143,796 shows a collapsible receptacle for dry flowable materials (grain, fertilizers, etc.) comprising a bag having top loading/bottom discharge features secured to a special sling having a bottom ring and four lift straps with loop ends to be hung from a special support stand. The bottom opening has a unique discharge spout including a draw rope and wire tie which functions to gather and close the bottom of the container.

Strelchuck U.S. Pat. Ser. No. 3,737,329 is directed to a sausage casing having cloth tapes stitched to the interior sides, a loose end of which provides a hanger loop.

Stoll U.S. Pat. Ser. No. 4,157,134 shows a bag having opposed sides containing foam flotation material. The exterior may be coated with a fluorescent material.

Curtis U.S. Pat. Ser. No. 3,173,464 shows a diaper storage container of tent like shape, with a rectangular wooden bottom and cloth sides, and which terminates at the top with the cloth gathered around a horizontally oriented wooden bar. The container has a vertical access slit and a loop type hanger strap.

Moodie U.K. 2,128,076 shows a generally cylindrical storage bag having an opening wider than its opposite end, a zipper side closure and a drawstring to reduce the girth of the larger open end. It is basically a conical duffel bag having a zippered side and a triangular gusset, inside and between the zipper tapes, to prevent stowed articles from catching the zipper teeth during closure.

Another approach is to employ fenders secured to docks or mooring poles. Old rubber tires are often used both on boats and docks where larger ships are moored. However these cause black marks on pleasure boats whose hulls are usually wood, resin such as gel-coated fiberglass, or aluminum. Porter in U.S. Pat. Ser. No. 3,475,914 shows use of three foam cylinders in a triple-pocket apron having a flap that fits over a mooring pole. The assembly is then lashed around the pole.

Further, dock conditions vary widely, and older wooden or cement docks cause significant abrasion, scuffing, and early failure of fenders. The dirty and marked fenders are difficult if not impossible to clean because of their plastic or elastomeric composition; the ground-in dirt is embedded in the surface or trapped in the abraded areas.

To our knowledge there is no cover available for fenders which protects them against abrasion and is removable for cleaning, and also functions to provide a better means for securing the fender to the boat. Accordingly, there is a great need in the art for such an assembly. Those and other purposes and functions are provided by our invention.

THE INVENTION

OBJECTS

It is among the objects of the invention to provide a fender cover assembly which functions to prolong the life of the fender by protecting it against abrasion, dirtying and weathering.

It is another object to provide a cover member for boat fenders which is easily removable, securely holds the fender, and has a strap for securing to the boat and doubles as a carrying and hang-up strap.

It is another object to provide a combined fender cover, fender retainer, and fender suspending assembly, characterized in that the suspension member is a strap which resists displacement of the fender when trapped between the boat and dock.

Still other objects will be apparent from the figures and balance of the Specification below.

FIGURES FIG. 1 shows in perspective the protector cover/suspension assembly of this invention in its use position securing a fender to a boat; FIG. 2 is a close-up perspective of the assembly turned a quarter turn to show the detail of the hanger strap and lacing; FIG. 3 is a plan view of the cover from the inside before mounting on a fender; and FIG. 4 shows a cross-section detail of the lace-hiding flap taken along lines 4—4 of FIG. 3.

SUMMARY

The combined protective and suspending assembly comprises a substantially rectangular or square sheet of fabric, preferably a heavy weight, rip-stop type nylon fabric, forming a cover for the fender, which cover has opposed vertical edges reinforced by webbing or doubling-over of the marginal edges, and a drawstring tube provided in the lower margin.

The length between the vertical edges of the cover is less than or equal to the circumference of the fender, and the vertical height from bottom drawstring tube to top margin is equal to or less than the full height of the fender, ranging from about 60 to 100% the fender height, preferably 80-95% thereof.

The two side margin tapes or webbing are of any heavy webbing material but preferably are formed as a stitched or glued laminate of a heavy weight marine canvas (such as "Argonaut" brand canvas) secured to a reinforced heavy duty vinyl (such as "Vivatex" brand vinyl). The two side margin webbings are secured along one margin thereof to the inside of the fabric sheet. The webbings extend beyond the upper edge at an angle inclined toward the center line of the fabric, and are joined a short distance above the upper margin in an inverted Y-configuration. One of the webs extends beyond the Y and has grommets (preferably plastic or non-corrodible metal) therein to permit removably securing the assembly to turnbuckles on the boat hull, deck or super-structure. A series of holes or grommets are provided in each of the vertical side webbings to receive lacing, and the fabric sheet overlies the webbing to hide and protect the lacing from chafing.

The Y-strap configuration causes the upper end of the assembly to generally form a circle through which a cylindrical fender is passed. The lower eye projects below the lower margin sufficiently so that when the drawstring at the bottom is pulled tight around the lower rounded shell of the fender, the eye-flange projects. The excess drawstring lacing can be passed through the lower eye, preventing the fender from riding up and popping out of the cover assembly. The vertical side laces are then pulled tight and tied off.

A single lacing can be used for both the drawstring and the side laces. The extending strap or webbing can be sufficiently long so that it can be used to tie the assembly to a cleat on the boat deck if turnbuckles are not provided. The upper end of the fender projects from the assembly. However, the strap is of sufficient length that it can first be passed through the eye before securing to the boat, if desired. The strap webbing width, and position of the Y-juncture are such that they prevent the assembly from rolling along the boat as the fender is wedged between the dock and boat. Preferably the Y and extending strap are "double" straps formed by using canvas from one side margin web and reinforced vinyl material from the other margin web.

The fabric may be of color to match or contrast with the boat, sails, tarps or sun roofs, or it can receive and display various racing or manufacturer's logos. The cover is easily removable for cleaning. The Y strap provides a carrying handle, and the strap is long enough, and grommet holes well placed to permit ease of hanging in a boat house, garage or home over a nail or hook.

DETAILED DESCRIPTION OF THE PREFERRED EMBODIMENT:

The following detailed description illustrates the invention by way of example and not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
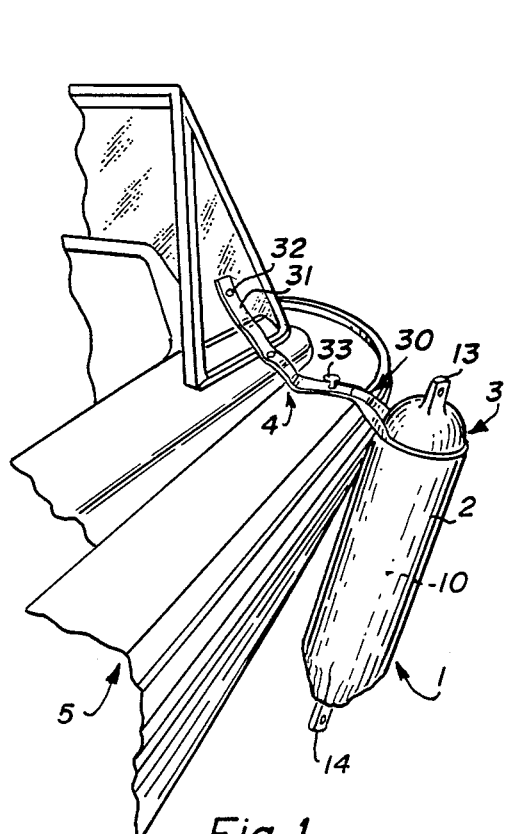
Figure 2:
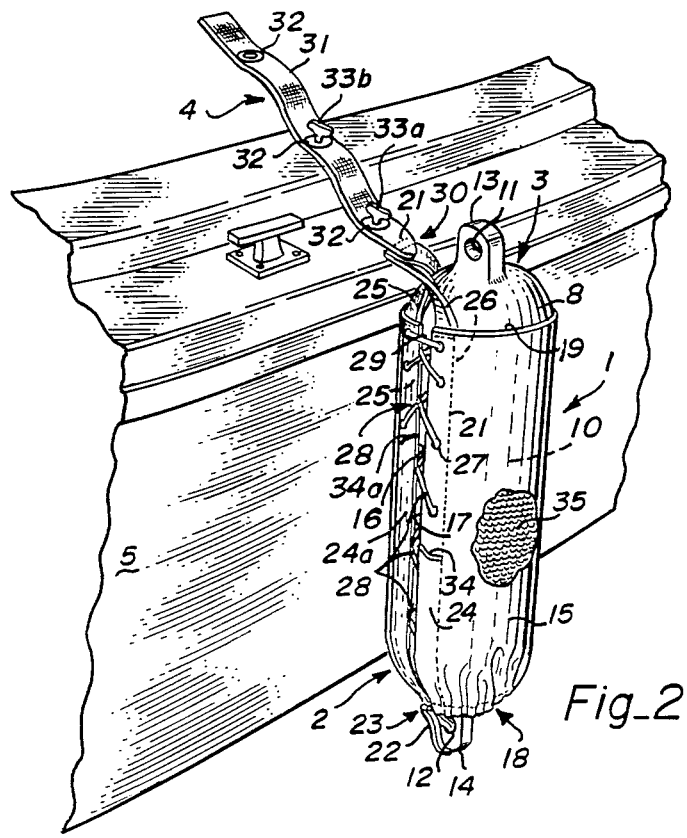

FIGS. 1 and 2 show in perspective the fender protection/suspension assembly 1 comprising cover 2 securing fender 3 to a boat 5 via strap 4. The fender is characterized as having a cylindrical body 10 with eyes 11, 12 in flanges 13, 14 disposed at opposite ends of the body 10.

As best seen in FIG. 2, extension portion 31 of strap 4 has grommets 32 which receivingly engage turnbuckles 33. The turnbuckle may be mounted at any convenient place on the boat, for example, as shown on deck 33a, or on housing 33b. As can be seen from the figure, the cover itself extends upwardly over the cylindrical body portion 10 of the fender to the approximate area where the rounded upper end fairs into the body portion at 8. Note that the lower flange 14 extends through the opening formed by the drawstring. When the fender is placed into the cover 2, it is pushed downwardly sufficiently far that the flange 14 extends therethrough. Then the drawstring 22 is pulled tight and passed through the eye so that the fender does not ride upwardly. The remaining length of the drawstring can then be used to lace the cover around the fender as described in more detail below. Optionally and preferably, the drawstring can be knotted, as at 23, before it is passed through the lower eye in flange 14.

Looking now at FIG. 2, this Figure shows the assembly 1 twisted unnaturally a ¼ turn so the lacing 28 shows. The two straps 25 and 26 extend upwardly beyond the top margin 19 of the cover 2. They join at a Y-junction 30. One of the straps may continue on as a hanger strap extension 31, or a separate strap may be used for extension 31. Typically, the extension portion 31 is on the order of 1-2 feet long, preferably 18 inches long, with grommets 32 being spaced approximately every 6 inches. Grommets 32 may be of weather and salt water resistant metal or marine-grade plastic. Turnbuckles 33 are received therein for securing the strap to the boat. The upper flange 13 with its eye 11 is shown in the figures as being free, but a secondary tether may be employed if desired. FIG. 2 also shows the hidden lacing feature. Flaps 24, 24a in the lower portion of FIG. 2 cover and protect the lacing 27 against chafing against the side of the boat 5. The lacing 28 is revealed above the broken away portion along lines 34, 34a.

Figure 3:
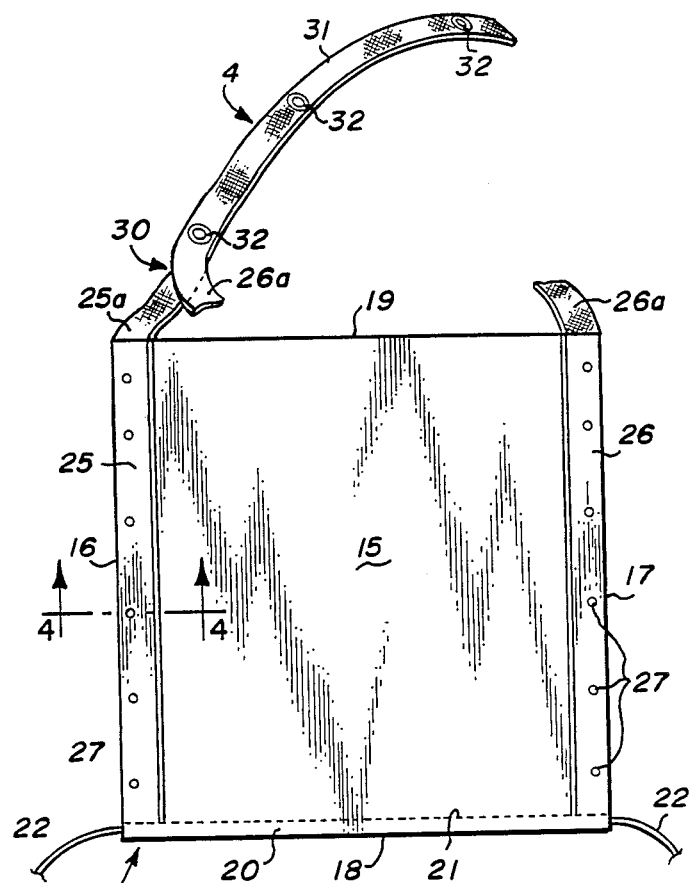

FIG. 3 shows the cover alone from the inside, partially constructed before the strap 26 is sown to strap 25 at the Y-junction 30. The cover 2 comprises a sheet of fabric, typically nylon such as 8-10 ounce marine grade nylon. For a fender having a dimension of 18 inches between the centers of the 2 eyes, the height of the fabric from the bottom margin 18 to the top margin 19 is on the order of 12-16 inches. The width from the side margin 16 to the side margin 17 is on the order of 15 inches as compared to the diameter of the fender which is on the order of 16 inches. The four margins may be turned in and sewn to prevent unraveling. In addition, spaced up from the bottom edge approximately ½ inch is a line of stitching 21 which forms a pocket 20 to receive the drawstring 22.

Heavy webbing 25 and 26 is provided the full vertical height along each right and left marginal edge respectively. This webbing is on the order of 1½ inches wide. The same type of webbing is used as the hanger strap 4. Three separate straps 25/ 25a, 26/26a and 31 may be used, with them being sewn together at the juncture 30. Or, in the alternative, a single strap may be used for the side margin strap 25, 25a extending on up to the hanger strap 31, with appropriate pleats to provide the required angles, and then the other side margin web 26, 26a is sewn to it at the juncture 30. Our presently preferred alternative is to provide a double strap formed by extending canvas only from strap 25 as portion 25a, 31 which is sewn along both side margins to reinforced vinyl only extending up from web laminate 26, as portion 26a, 31. Alternatively, the web may be run up one side margin, then folded back on itself to run down the other side margin. This provides a single continuous webbing forming both side margin webs. A second webbing is then provided as the extension 31 which is sewn to the juncture at 30.

The holes 27 are provided approximately every 2½" vertically along the webbing, with the exception that the upper two or three holes are spaced only about 1" apart. These holes may be cut through webbing before being sewn together, or may be burnt therethrough so that the melted edges of the hole provide a rip-stop function.

As best seen in FIG. 2, hidden lacing 28 is used to secure the cover to the fender. This may be a separate lacing, or as is presently preferred, the drawstring 22 is extended upwardly by passing through the lower eye 12 of the fender to form the lacing. We prefer to pull the drawstring tightly closed along the lower flange 14, tie off the drawstring at bottom knot 23, pass it over the outside of the flange, then back through the lower eye 12 and upwardly alternately through the holes 27 in the side margins 25, 26 to form the lacing 28. It is then tied off at the top, as shown by top knot 29, and the ends are tucked under the side margins of the fabric.

Figure 4:
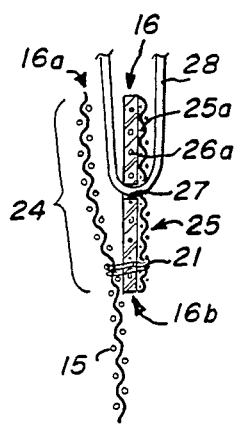

FIG. 4 shows in section the hidden lacing feature, which is the same for both cover margins/margin webs 16/25 and 17/26. The webbing 25 has its outer margin 16 aligned with the outer margin 16a of the fabric fender cover sheet 15. Web 25 is stitched adjacent its inner margin 16c to the sheet 15 at 21. This provides a lace-protective and concealing flap 24 of cover material 15 for hiding and preventing chafing of laces 28 passing through holes 27 of the webbing 25a, 26a.

The width of the strap 31, and/or the width of the two straps 25, 26 coming together to form the junction 30, helps prevent the rolling of the fender against the side of the boat. This results in a reduced twisting of the tether, thereby preventing premature failure of that tether. Twisting tends to occur along both straps 25, 26 which result in double-strength at the point of greatest stress. Further, the fender tends to stay put in the appropriate location along the side of the boat.

It can be seen by this construction that the cover/suspension assembly properly positions the fender, prevents its premature weathering and reduces abrasion. The cover can be removed from time to time and washed. In addition, the extension strap 31 can serve as a hand-hold for carrying the fender. The grommets also serve as a means by which the fenders, when stored, can be hung on hooks or nails in boathouses, etc.

Still further, the fender and cover assembly as shown herein can serve a valuable safety purpose. For example, when at sea, should someone fall overboard, the assembly can be removed from a turnbuckle; using the hanger strap extension 31 as a sling, the entire assembly can be flung great distances to the person overboard. The fender then acts as a float, and the strap is easy to grasp by the person in the water.

The nylon cover can also be impregnated or coated with reflective beads 35 (FIG. 2) so that the fenders serve as reflective markers which are highly useful at night. When hung on the boat, the reflective covers help in locating the boat in areas of high traffic or tight passages. In cases of using the fender and cover assembly as a emergency float, the reflective surface helps the person overboard locate the assembly when thrown in the water, and likewise helps the people on board locate the person hanging onto the float.

In addition, the cover can be provided in a variety of colors to color coordinate with the boat. In the alternative, the boat name or team logos can be used on the covers for aesthetic or identification purposes.

It should be understood that various modifications within the scope of this invention can be made by one of ordinary skill in the art without departing from the spirit thereof. We therefore wish our invention to be defined by the scope of the appended claims as the prior art will permit, and in view of the specification if need be.

PARTS LIST

| No. | Part | No. | Part |
|---|---|---|---|
| 1. | Assembly | 22. | Drawstring |
| 2. | Cover | 23. | Bottom Knot |
| 3. | Fender | 24. | Lace Hiding/Protecting Flap |
| 4. | Strap | | Lace Hiding/Protecting Flap |
| 5. | Boat | 24a. | Lace Hiding/Protecting Flap |
| 6. | | | Lace Hiding/Protecting Flap |
| 7. | | 25. | Left Margin Web |
| 8. | Upper end of body fairing into cylindrical section | 26. | Right Margin Web |
| | | 27. | Holes for Lacing |
| 9. | | 28. | Lacing |
| 10. | Cylindrical body | 29. | Top Knot |
| 11. | Fender Upper Eye | 30. | Y-Join of Webbing |
| 12. | Fender Lower Eye | 31. | Hanger Strap XTN |
| 13. | Flanges | 32. | Grommets |
| 14. | Flanges | 33a. | Turnbuckles |
| 15. | Cover Sheet | 33b. | |
| 16. | Left Vertical Margin of Web | 34. | Breakaway Line for Flaps 24, 24a |
| 16a. | Left Margin of Cover 2 | | |
| 16b. | Inner Margin of Web 25 | 34a. | " |
| 17. | Right Vertical Margin | 35. | Reflective Beading |
| 18. | Bottom Margin | | |
| 19. | Top Margin | | |
| 20. | Drawstring Pocket | | |
| 21. | Stitching | | |

We claim:

1. A protective cover and hanger assembly for fenders comprising in operative combination:
   a. a substantially rectangular sheet having a pair of opposed side margins, a top margin and a bottom margin;
   b. said bottom margin being folded up and fastened to said sheet a sufficient distance above said bottom margin to form a tube for receiving a drawstring;
   c. a first and a second webbing portion, each webbing portion being attached substantially continuously therealong adjacent one of said vertical side margins, respectively;
   d. said webbing portions extending beyond the upper margin, with said first and second webbing being joined together thereabove in a manner that forms said sheet into a circular tube having a vertical open side slit, said circular tube receiving therein a substantially cylindrical fender;

e. a webbing member extending upwardly beyond the juncture of said first and second webbing members to provide a hanger strap for securing said assembly having said fender received therein to a structure.

2. A protective fender cover assembly as in claim 1 wherein a series of holes are provided in said webbing adjacent said attachment thereof to each of said vertical side margins of said sheet to permit lacing of said cover around said fender.

3. A protective fender cover assembly as in claim 2 wherein said cover adjacent said side margins overlies said two webbing portions to provide a protective and concealing flap for said lacing.

4. A protective fender cover as in claim 3 wherein said hanger strap includes means for removably securing said strap to said structure.

5. A protective fender cover as in claim 4 wherein said hanger strap securing means comprises grommets matingly engageable with and releasably securable to turnbuckles secured to said structure.

6. A protective fender cover as in claim 4 wherein:
(a) said fender is generally cylindrical, having an elongated body with an upper and a lower end, and a flange with an eye disposed at the lower end thereof; and
(b) said drawstring is of length sufficient to be securable to said eye.

7. A protective fender cover as in claim 6 wherein said drawstring has a length sufficient to provide said lacing of said cover around said fender.

8. A protective fender cover as in claim 6 wherein the vertical height of said cover is less than the length of the body of said fender, and the width of said cover is equal to or less than the circumference of said fender.

9. A protective fender cover as in claim 6 wherein said lower eye projects below the drawstring portion of said cover, said cover extends upwardly along said fender terminating adjacent the faring of a rounded upper end of said fender into the cylindrical body portion of said.

10. A protective fender cover as in claim 9 wherein said drawstring has a length sufficient to provide said lacing of said cover around said fender.

11. A protective fender cover as in claim 1 wherein said webbing portions join and are secured together in a Y-juncture spaced above said upper margin.

12. A protective fender cover as in claim 11 wherein said side margin is a continuous length of webbing and said hanger strap is a separate piece of webbing joined thereto at said Y-juncture.

13. A protective fender cover as in claim 10 wherein said webbing portions join and are secured together in a Y-juncture spaced above said side margin is a continuous length of webbing and said hanger strap is a separate piece of webbing joined thereto at said Y-juncture.

14. A protective fender cover as in claim 1 wherein said cloth has an exterior side and an interior side, and said exterior side includes means for enhancing night reflectivity.

15. A protective fender cover as in claim 3 wherein said cloth has an exterior side and an interior side, and said exterior side includes means for enhancing night reflectivity.

16. A protective fender cover as in claim 6 wherein said cloth has an exterior side and an interior side, and said exterior side includes means for enhancing night reflectivity.

17. A protective fender cover as in claim 10 wherein said cloth has an exterior side and an interior side, and said exterior side includes means for enhancing night reflectivity.

18. A protective fender cover as in claim 14 wherein said night reflectivity means comprises a reflective coating on selected portions of said exterior surface.

19. A protective fender cover as in claim 16 wherein said night reflectivity means comprises a reflective coating on selected portions of said exterior surface.

20. A protective fender cover as in claim 17 wherein said night reflectivity means comprises a reflective coating on selected portions of said exterior surface.

* * * * *